(12) United States Patent
Zuo et al.

(10) Patent No.: US 8,411,387 B2
(45) Date of Patent: Apr. 2, 2013

(54) INJECTING PROCESSING FLUID WHILE WRITING DATA

(75) Inventors: Xu Zuo, Prior Lake, MN (US); Lon Buske, Apple Valley, MN (US)

(73) Assignee: Seagate Technology LLC, Cupertino, CA (US)

( * ) Notice: Subject to any disclaimer, the term of this patent is extended or adjusted under 35 U.S.C. 154(b) by 959 days.

(21) Appl. No.: 12/486,012

(22) Filed: Jun. 17, 2009

(65) Prior Publication Data

US 2010/0183423 A1 Jul. 22, 2010

Related U.S. Application Data

(60) Provisional application No. 61/146,289, filed on Jan. 21, 2009.

(51) Int. Cl.
*G11B 33/14* (2006.01)

(52) U.S. Cl. ........................................ 360/75; 360/97.13

(58) Field of Classification Search .................. None
See application file for complete search history.

(56) References Cited

U.S. PATENT DOCUMENTS

| | | | |
|---|---|---|---|
| 3,148,248 A | 9/1964 | Johnson | |
| 3,688,289 A * | 8/1972 | Schnell et al. | 360/135 |
| 4,208,678 A * | 6/1980 | Laman | 360/71 |
| 4,285,018 A | 8/1981 | Mulvaney et al. | |
| 4,396,964 A * | 8/1983 | Morehouse et al. | 360/97.17 |
| 4,412,261 A * | 10/1983 | Tateyama et al. | 360/97.17 |
| 4,562,499 A * | 12/1985 | Mizoshita | 360/97.16 |
| 4,583,213 A | 4/1986 | Bracken et al. | |
| 4,636,891 A * | 1/1987 | Barski | 360/97.17 |
| 4,710,830 A * | 12/1987 | Imai et al. | 360/97.16 |
| 4,780,776 A * | 10/1988 | Dushkes | 360/78.12 |
| 5,636,082 A | 6/1997 | Shibuya et al. | |
| 5,696,649 A | 12/1997 | Boutaghou | |
| 5,818,658 A | 10/1998 | Balster et al. | |
| 5,898,545 A | 4/1999 | Schirle | |
| 5,907,453 A | 5/1999 | Wood et al. | |
| 5,956,203 A | 9/1999 | Schirle et al. | |
| 6,091,570 A | 7/2000 | Hendriks | |
| 6,147,834 A | 11/2000 | Srikrishna et al. | |
| 6,259,576 B1 | 7/2001 | Ahn | |
| 6,369,978 B1 | 4/2002 | Shimizu et al. | |
| 6,385,007 B1 * | 5/2002 | Li | 360/69 |
| 6,392,832 B1 | 5/2002 | Oshiki et al. | |
| 6,445,540 B1 | 9/2002 | Toffle et al. | |
| 6,449,119 B1 | 9/2002 | Hashizume et al. | |
| 6,710,977 B2 | 3/2004 | Tadepalli et al. | |
| 6,728,062 B1 | 4/2004 | Ou-Yang et al. | |
| 6,900,968 B2 | 5/2005 | Buske et al. | |
| 6,937,433 B2 | 8/2005 | Dahlenburg et al. | |
| 6,985,333 B1 | 1/2006 | Hiller et al. | |
| 6,987,640 B2 | 1/2006 | Tsang et al. | |
| 2002/0015255 A1 | 2/2002 | Tadepalli et al. | |

(Continued)

FOREIGN PATENT DOCUMENTS

JP 2008-108829 A * 5/2008

*Primary Examiner* — Hoa T Nguyen
*Assistant Examiner* — James L Habermehl
(74) *Attorney, Agent, or Firm* — Braden Katterheinrich

(57) ABSTRACT

An apparatus and associated method is provided for injecting a processing fluid in a device that operably rotates a disc stack. A fluid injector has a nozzle defining an outlet sized to longitudinally span the disc stack to operably direct the processing fluid toward the disc stack. The nozzle also has a flow rate feature that operably directs a first flow rate of the processing fluid from the nozzle into a space adjacent a storage surface of a first disc of the disc stack and that directs a substantially different second flow rate of the processing fluid from the nozzle into another space adjacent a storage surface of a second disc of the disc stack.

15 Claims, 7 Drawing Sheets

U.S. PATENT DOCUMENTS

| | | |
|---|---|---|
| 2002/0030924 A1 | 3/2002 | Shimizu et al. |
| 2002/0039253 A1 | 4/2002 | Imai et al. |
| 2002/0075591 A1 | 6/2002 | Chang et al. |
| 2002/0181138 A1 | 12/2002 | Toffle et al. |
| 2002/0181148 A1 | 12/2002 | Dahlenburg et al. |
| 2004/0184180 A1 | 9/2004 | Tadepalli et al. |

* cited by examiner

INJECTING PROCESSING FLUID WHILE WRITING DATA

RELATED APPLICATIONS

This application claims the benefit of the earlier filing date of U.S. provisional patent application Ser. No. 61/346,289.

BACKGROUND

Data writing devices function to digitally encode and store information. In a writing device employing a rotary actuator, such as a servo writer or a disc drive and the like, data transfer members are supported at the end of thin cantilevered actuator arms that merge into the spaces between adjacent discs in a disc stack. The actuator arms are operably positioned to precisely locate the data transfer members with respect to addressable locations of a storage media.

Some environmental conditions create problems that have been the subject of continual improvement efforts for some time. Cleanliness, for example, has long been known to be important in the process of writing data because of the extremely small space that exists between the data transfer member and the media during writing. A contaminant particle that gets trapped in that space can cause damage to the data transfer member and to the storage media. Windage is another example of an environmental condition creating problems that have continually been the subject of mitigation efforts. The outwardly spiraling windage currents can create perturbations that excite the actuator arm, the head gimbal assembly (HGA) supported by the actuator arm, and the edge of the disc, usually causing non-repeatable displacements of the data transfer member away from the target track.

Other environmental issues are heretofore unrecognized as being a concern because they arise as the result of new constraints brought on by modern levels of data storage areal density. That is, the positioning scrutiny demanded by today's smaller storage track widths means that some sources of variation that were once ignored as negligible must now be confronted. Under these constraints, it has been observed that in some circumstances a spindle motor operably supporting a disc stack can transfer enough thermal energy to the HGAs in the disc stack to produce measurable low frequency DC wander in the HGAs. The magnitude of this thermal excitation and the resulting DC error tends to be transient, and tends to affect discs within the same disc stack differently. The present embodiments are directed to novel solutions to these problems.

SUMMARY

In some embodiments a fluid injector is provided in a device that operably rotates a disc stack. The fluid injector has a nozzle defining an outlet sized to longitudinally span the disc stack to operably direct a processing fluid toward the disc stack. The nozzle also has a flow rate feature that operably directs a first flow rate of the processing fluid from the nozzle into a space adjacent a storage surface of a first disc of the disc stack and that directs a substantially different second flow rate of the processing fluid from the nozzle into another space adjacent a storage surface of a second disc of the disc stack.

In some embodiments a method is provided for operating a device to rotate a disc stack, and for supplying a processing fluid to a fluid injector having a nozzle defining an outlet longitudinally spanning the disc stack to, in turn, direct the processing fluid toward the disc stack, wherein the nozzle has a flow rate feature that directs a first flow rate of the processing fluid from the nozzle into a space adjacent a storage surface of a first disc of the disc stack and that directs a substantially different second flow rate of the processing fluid from the nozzle into another space adjacent a storage surface of a second disc of the disc stack.

In some embodiments a data writing device is provided that has a spindle operably supporting a disc stack in a data transfer relationship with a plurality of data transfer members, and means for controlling part-to-part positional variation among different data transfer members of the plurality in relation to respective storage locations of the disc stack by substantially equalizing environmental temperatures in spaces adjacent the discs in the disc stack where the data transfer members reside in response to thermal excitation created by operating the writing device that heats the spaces at different rates.

DETAILED DESCRIPTION OF ILLUSTRATIVE EMBODIMENTS

Figure 1:
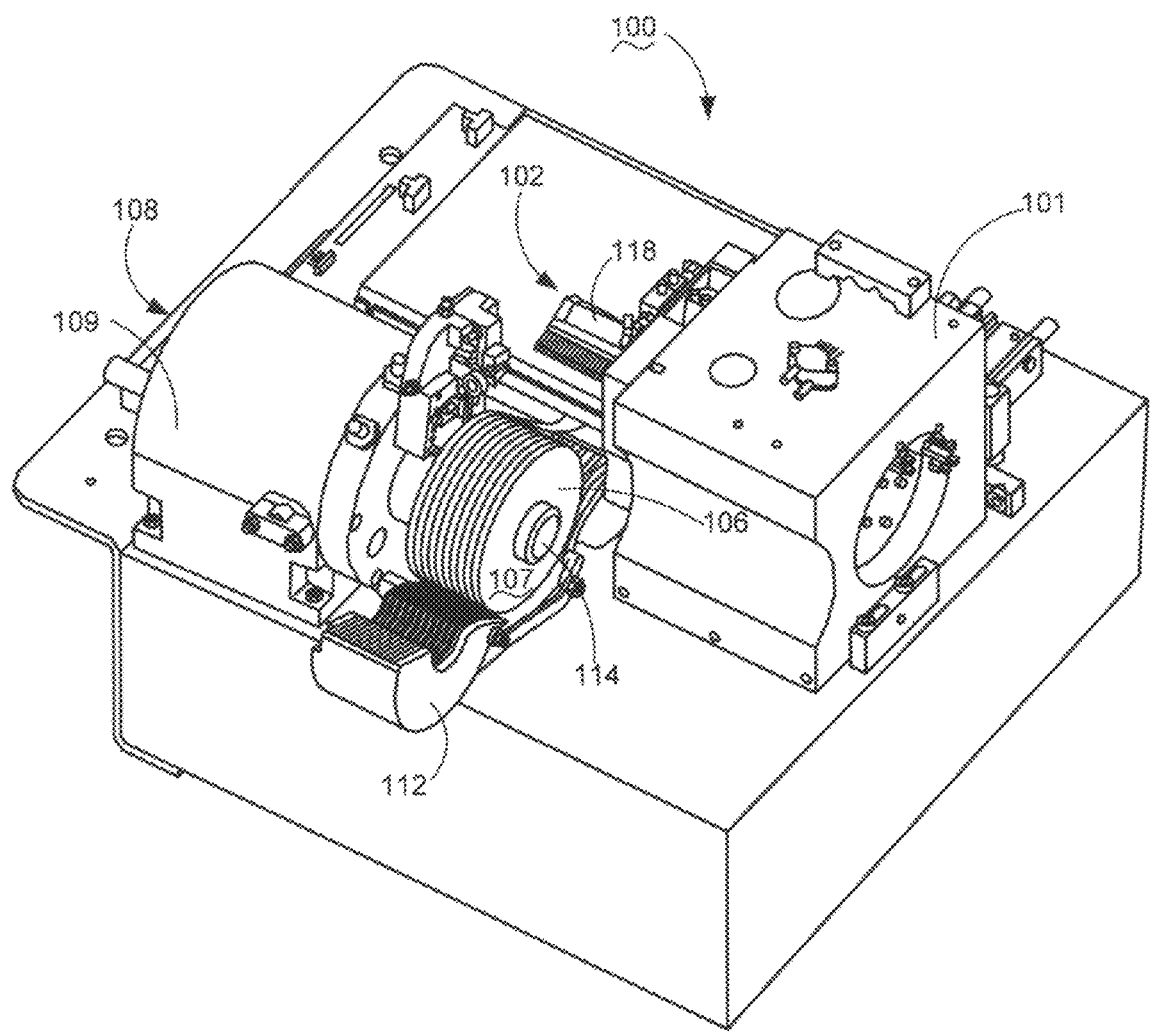
FIG. 1 is an isometric depiction of a data writing device that is constructed in accordance with embodiments of the present invention.
Figure 2:
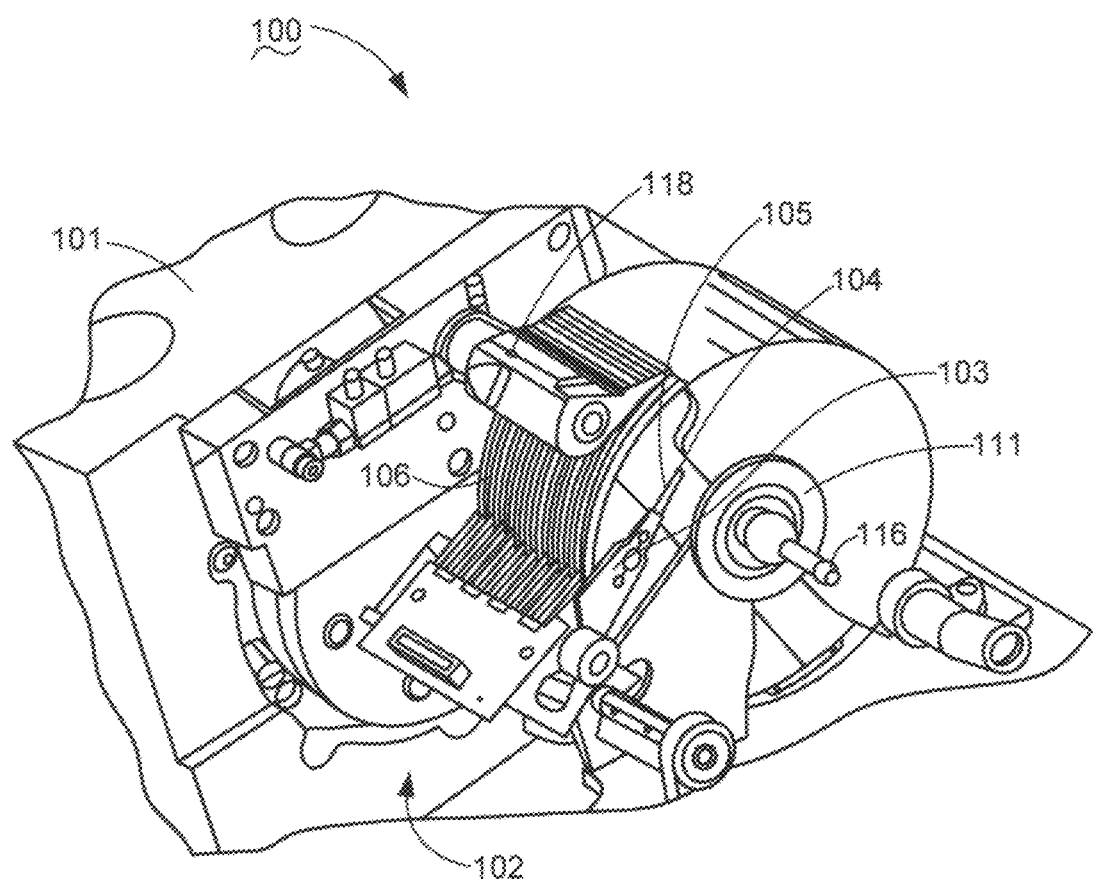
FIG. 2 is an enlarged detail of a portion of the data writing device of FIG. 1.

FIGS. 1 and 2 are views of a data writing device 100 that is constructed in accordance with the claimed embodiments. The device 100 can be programmed to perform various processes such as servowriting and media certifying. Generally, an actuator assembly 102 includes a motor 101 that rotationally positions an actuator 103. The actuator 103 includes a number of cantilevered arms supporting respective head gimbal assemblies (HGAs) 105, each HGA 105 including a data transfer member 104 such as a transducer. Delicate suspension members of the HGAs 105 operably fly the data transfer members 104 at a desired spatial separation from data storage surfaces 107 of respective data storage discs 106, the desired spatial separation being conducive to a reliable data transfer relationship. Host access commands are executed by the device 100 to store data to and retrieve data from a stacked plurality of the data storage discs 106, referred to herein as a "disc stack."

A spindle assembly 108 includes a motor 109 that operably rotates a removable hub 111 to which the disc stack is affixed in rotation therewith. Note that in FIG. 2 the spindle assembly 108 is not shown for clarity sake, in order to show the end of the hub 111 that is gripped by the motor 109 via a quick connect feature 116. The hub 111 has a clamp 114 at the other end thereof for affixing the discs 106 to the hub 111.

FIG. 1 depicts the device 100 in a load/unload mode whereby the actuator assembly 102 is moved away from the spindle assembly 108, and a shroud 112 is pivoted away to clearingly disengage the disc stack. This mode permits unloading a processed disc stack from the spindle assembly 108, and then loading a next disc stack to be processed.

After the next disc stack is loaded to the spindle assembly 108, the device 100 is returned to the operational mode depicted in FIG. 2. A comb 118 pivots fingers toward the HGAs 105 to spread the data transfer members 104 apart, thereby creating clearances sufficient for merging the disc stack and the actuator 103. After merging, the comb 118 clearingly pivots away from the actuator 103 as depicted in FIG. 2. Processing continues by spinning the disc stack and rotationally positioning the actuator 103 to present the data transfer members 104 to various storage locations of the respective discs 106.

Figure 3:
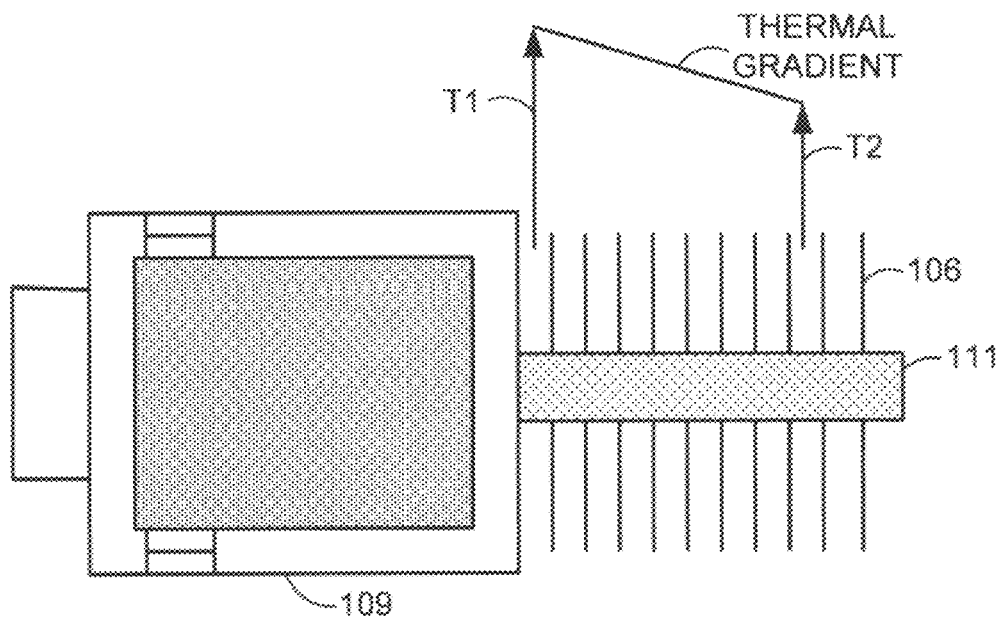
FIG. 3 is a diagrammatic depiction of the motor and disc stack in the data writing device of FIG. 1.

FIG. 3 is a diagrammatic view of the motor 109 supporting the hub 111 to which the disc stack is affixed. The motor 109 generates heat when it is energized to rotate the disc stack. The amount of heat that is generated depends generally on the duty cycle of the motor 109. That is, the heat builds up during each "on cycle" while the motor is spinning a disc stack, and the heat dissipates during each "off cycle" while the processed disc stack is unloaded and the next disc stack is loaded. Generally, not all the generated heat is dissipated during a changeover before the motor is started again, so over time the motor 109 cumulatively builds up heat. That heat from the motor 109 is conductively transferred through the hub 111 to warm the spaces adjacent the discs 106 in the disc stack where the HGAs 105 reside, via convection into the spaces and conduction through the discs 106.

The HGAs 105 nearest the heat source (motor 109) are subjected to the greatest thermal excitation "T1" while those farthest from the heat source are subjected to the least thermal excitation "T2," it has been observed that a thermal gradient with temperature differences on the order of 20° F. can be established by the differential thermal excitations T1, T2. It has also been observed that a thermal gradient of that magnitude can result in problematic differential thermal drifting of the HGAs 105 across the disc stack. That is, the differential thermal drifting sets ups problematic servo positioning requirements to compensate for DC error rates that vary in accordance with the existence of and magnitude of the thermal gradient across the disc stack.

Figure 4:
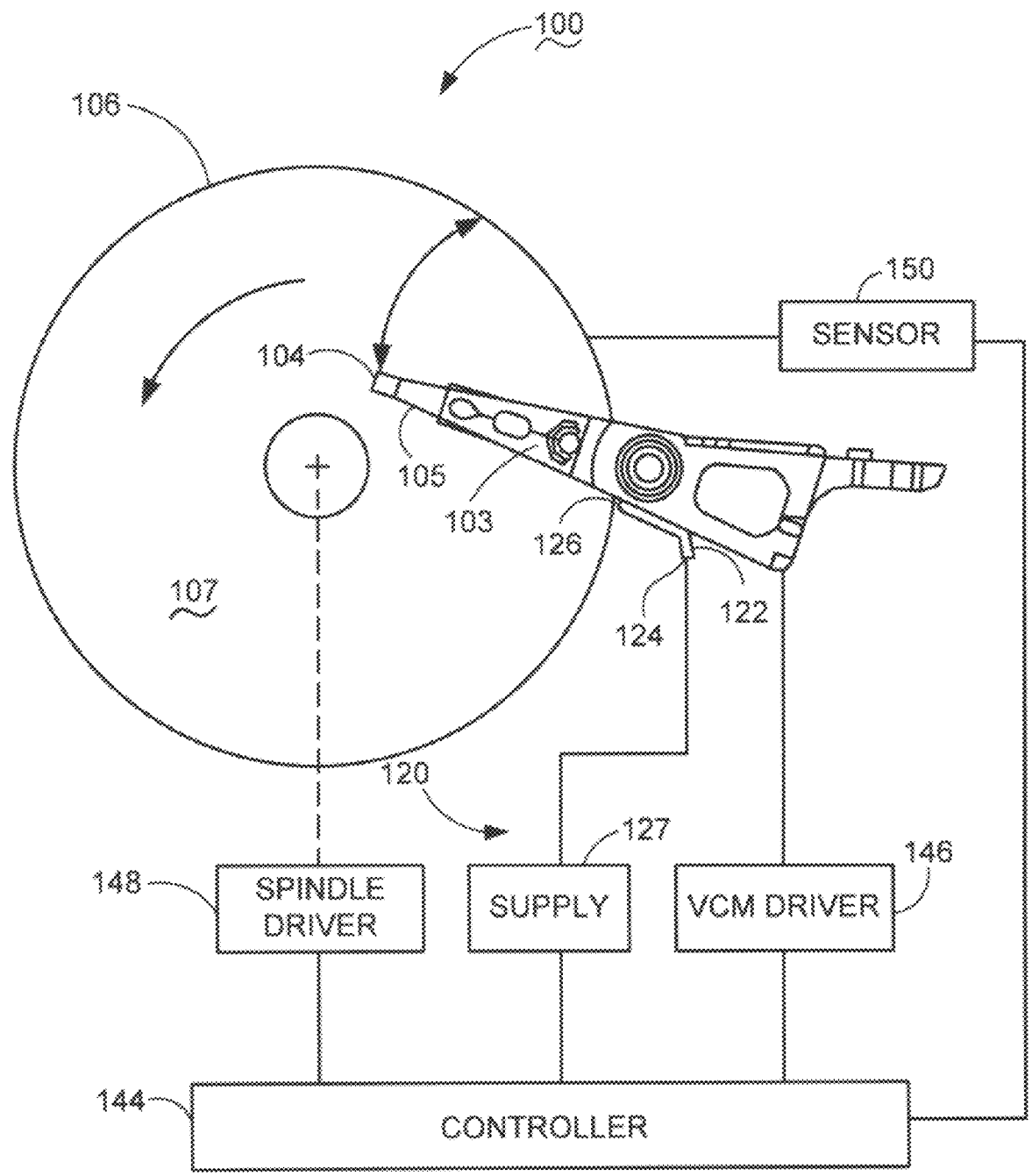
FIG. 4 is a diagrammatic and functional block depiction of the data writing device of FIG. 1.

FIG. 4 is a diagrammatic and functional block depiction of the device 100 showing a manner in which it employs a fluid injector 120 to counter the thermal excitation. The fluid injector includes a nozzle 122 that has an inlet 124 for receiving a processing fluid from a supply 127. The processing fluid in these illustrative embodiments is a cooling fluid, a fluid supplied at a relatively low temperature so that it functions to cool the environment in the disc stack where the HGAs 105 reside. The processing fluid can be filtered and dried air, or alternatively it can be a similarly filtered and dried inert gas. The supply 127 can be a pressurized container of the processing fluid, or alternatively the processing fluid can be mechanically pressurized such as by a blower.

The nozzle 122 guides the processing fluid from the inlet 124 to exit through an outlet 126 that directs the processing fluid into the spaces adjacent the discs 106. For purposes of illustration, the outlet 126 depicted in FIG. 4 is close to the edges of the discs 106, although the contemplated embodiments are not so limited. Alternatively, the outlet 126 can be formed to merge into the spaces between adjacent discs 106 in order to position it nearer the HGAs 105. The nozzle 122 is depicted injecting the processing fluid on the upstream side of the actuator 103, as determined by the counter-clockwise disc stack rotation in FIG. 4. Also for purposes of illustration the nozzle 122 depicted in FIG. 4 is attached to the actuator 103 and fixed in movement therewith, although the contemplated embodiments are not so limited. Alternatively, the nozzle 122 can be supported independently of the actuator 103, and downstream of the actuator 103 as well as the upstream location depicted in FIG. 4.

In any event, the outlet 126 longitudinally spans the disc stack so that the processing fluid is directed into the spaces around the disc 106 nearest the motor 109 at one end of the disc stack, is likewise directed into the spaces around the disc 106 farthest from the motor 109 at the other end of the disc stack, and is likewise directed into the spaces around all the discs 106 therebetween the ends of the disc stack.

Figure 5:
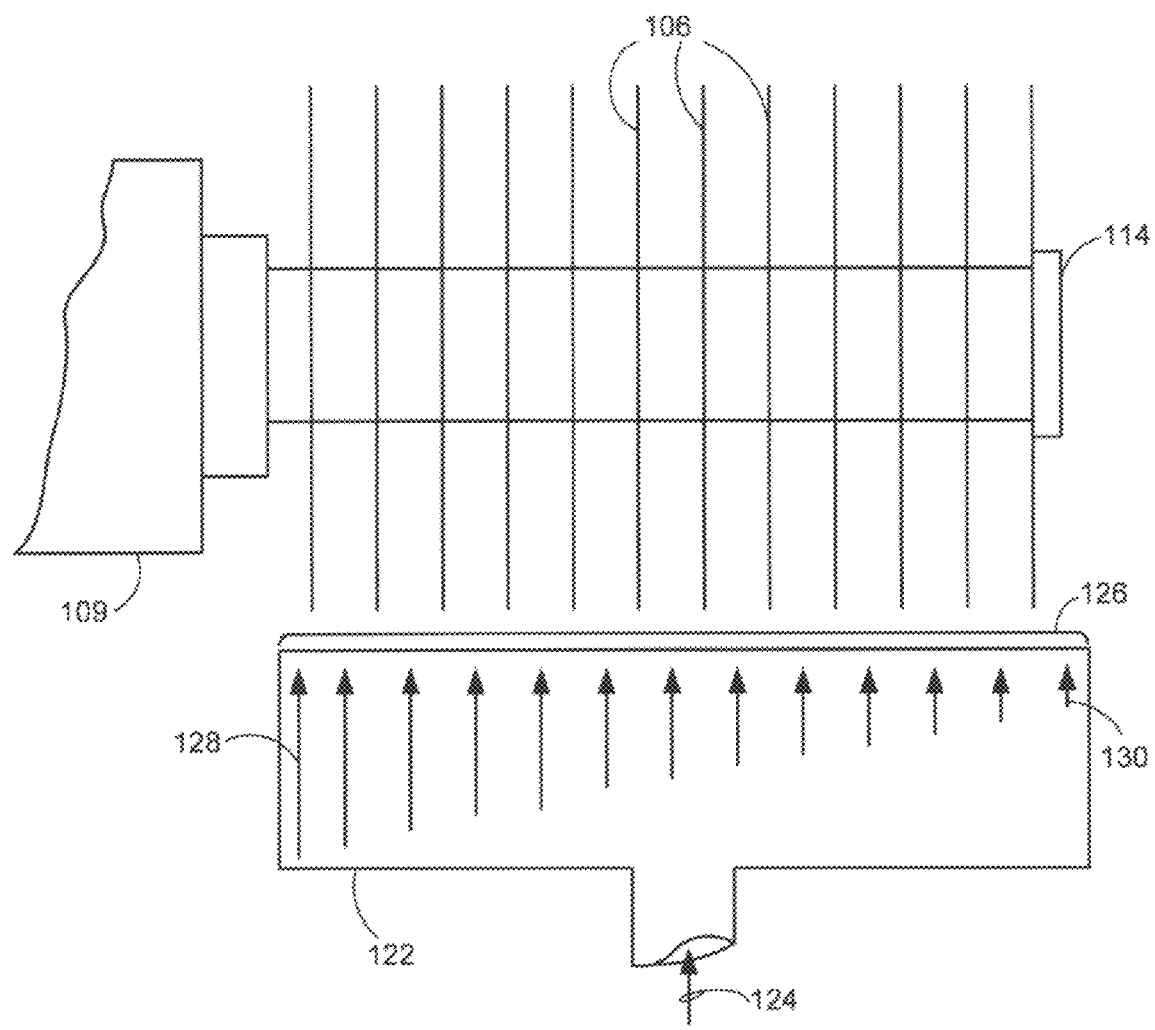
FIG. 5 is a diagrammatic depiction of the nozzle spanning the disc stack in the data writing device of FIG. 1.

FIG. 5 diagrammatically depicts this manner in which the nozzle 122 has an outlet 126 that longitudinally spans the disc stack. To best compensate for the thermal gradient existing across the disc stack (see FIG. 3), the nozzle 122 has a flow rate feature that varies the flow rate of the processing fluid across the disc stack. That is, a relatively greatest flow rate of the processing fluid is depicted by the largest arrow 128 at one end of the disc stack, and a relatively least flow rate of the processing fluid is depicted by the smallest arrow 130 at the other end of the disc stack. The flow rate feature further directs a desired flow rate profile across the disc stack between the maximum and minimum flow rates at the ends. FIG. 5 depicts a linear flow rate profile that incrementally decreases in relation to increasing distance from the motor 109, but the contemplated embodiments are not so limited. It might be determined either analytically or empirically that a non-linear profile yields better compensation for the expected thermal excitation.

Figure 6:
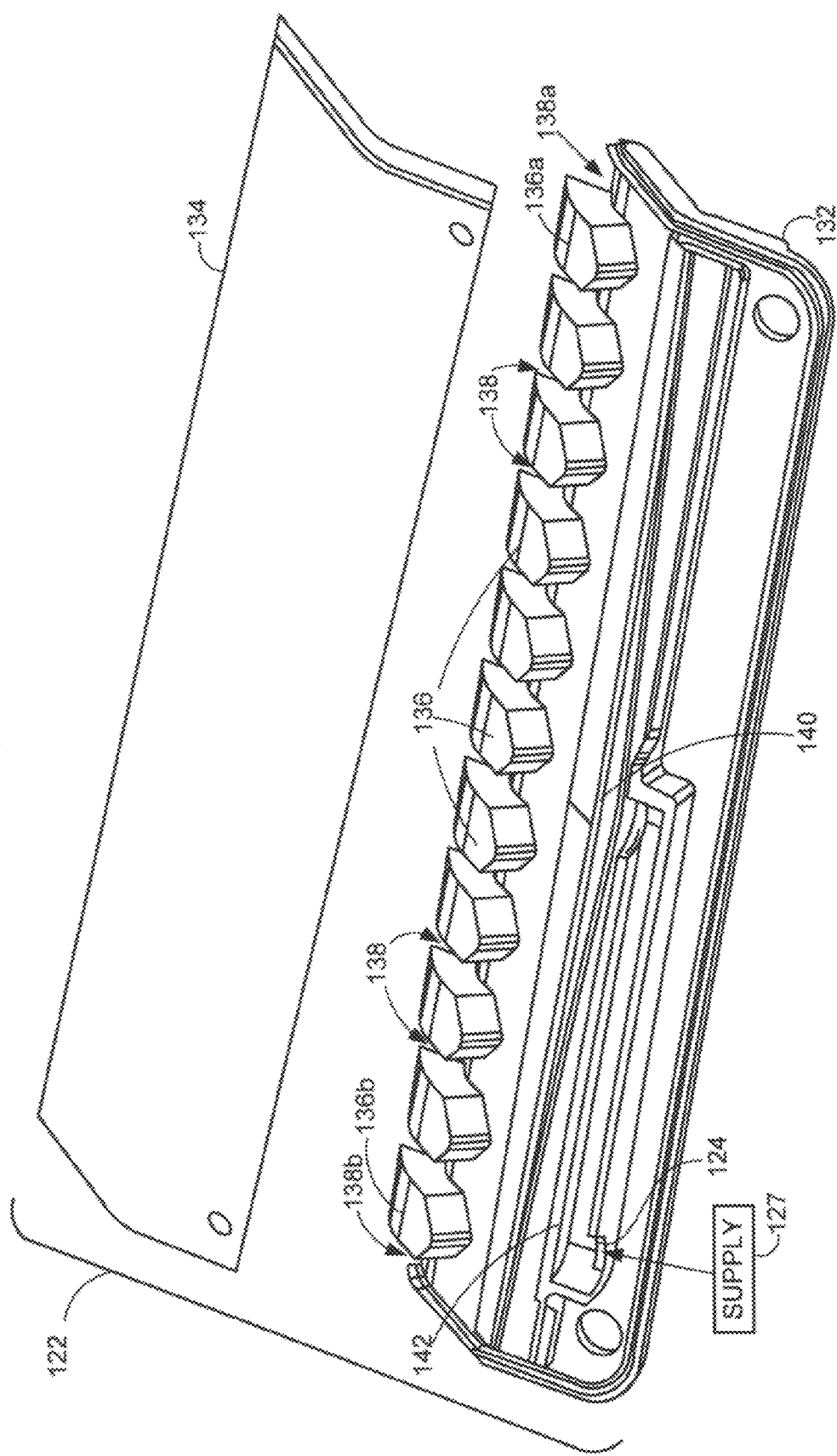
FIG. 6 is an exploded isometric depiction of a nozzle that is constructed in accordance with embodiments of the present invention.

FIG. 6 is an exploded isometric depiction of a nozzle 122 that is constructed in accordance with the present embodiments. The nozzle 122 has a base 132 and cover 134 that together form a hollow enclosure. A suitable number of deflectors 136 can be sized and/or shaped to create a plurality of individual outlet 138 openings through which the processing fluid is directed toward the disc stack. The outlets 138 can be spaced to align with the spacings adjacent each of the discs 106 in the disc stack, so that the processing fluid is directed toward where the HGAs 105 reside. Namely, in some embodiments a deflector 136a is sized and/or positioned so that it and the enclosure form an outlet 138a that is sized comparatively larger than the other outlets 138 formed by the deflectors 136. Likewise, a deflector 136b is sized and/or positioned so that it and the enclosure form an outlet 138b that is sized comparatively smaller than the other outlets 138 formed by the deflectors 136. The other deflectors 136 can he sized and/or positioned to define differently sized outlets 138 according to the desired flow rate profile across the nozzle outlet 126.

Another deflector 140 is presented to deadhead the incoming flow of processing fluid, and thereby distribute the individual incoming flow of the processing fluid. The incoming flow is divided into a major portion thereof that is diverted to the right (as viewed in FIG. 6) into a low pressure plenum created by a generally wide-open area inside the enclosure on the upstream side of the deflector 140. A minor portion of the incoming flow is diverted to the left (as viewed in FIG. 6) into a high pressure plenum created by a comparatively narrow passageway between the deflector 140 and a partition 142 forming a part of the inlet passageway.

Figure 7:
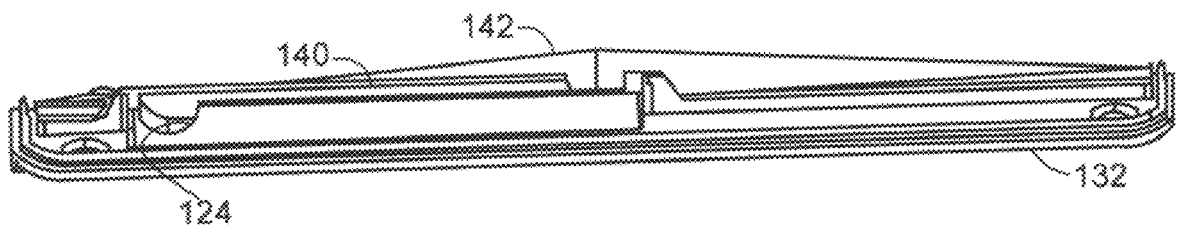
FIG. 7 is an elevational depiction of the base portion of the nozzle of FIG. 6.

Both the major and minor portions of the incoming flow eventually pass over the deflector 140 and proceed toward the outlets 138. FIG. 7 is an elevational depiction of the base 132, which best illustrates how the deflector 140 tapers downwardly in both directions to apportion the flow of both the major and minor portions of the incoming flow across the outlets 138. The deadhead deflector 140 and the selected use of varying the sizes of the outlets 138 function to apportion the processing fluid flowing inside the nozzle 122 from an individual flow entering the inlet 124 to a desired varying flow profile leaving the outlet 126.

Returning to FIG. 4, a flow rate of processing fluid from the supply 127 can be controlled by a controller 144, such as the same controller that controls the voice coil motor driver 146 and the spindle motor driver 148 in maintaining the data transfer relationship between the data transfer members 104 and the discs 106. The controller 144 may, for instance, control a valve or a blower to deliver processing fluid to the nozzle 122 in conjunction with a motor 109 duty cycle. The controller 144 can be programmed to lag such a delivery of the processing fluid until a predetermined number of processing cycles or an interval, if it is determined that at start up the heat excitation must build to a point that warrants compensation in accordance with the present embodiments. In some embodiments the fluid injector 120 can include a flow control device having a sensor 150 that is coupled to the controller 144 to selectively regulate the flow rate with which the processing fluid enters the nozzle 122 from the supply 127. The sensor 150 can be responsive to changes in temperature within the disc stack. Alternatively, the sensor 150 can routinely monitor the reliability with which data is being written, such as by performing a bit error assessment, and signal the controller 144 to regulate the flow rate of processing fluid accordingly.

In less expensive alternative embodiments the supply 127 is provided by windage that is created by the spinning disc stack. The outwardly spiraling windage currents can be guided to enter the inlet 124. In the least expensive alternatives the windage currents are continually guided to the nozzle 122, without any intervention by a controller to call for supplying or adjusting the processing fluid flow rate to the nozzle 122.

Figure 8:
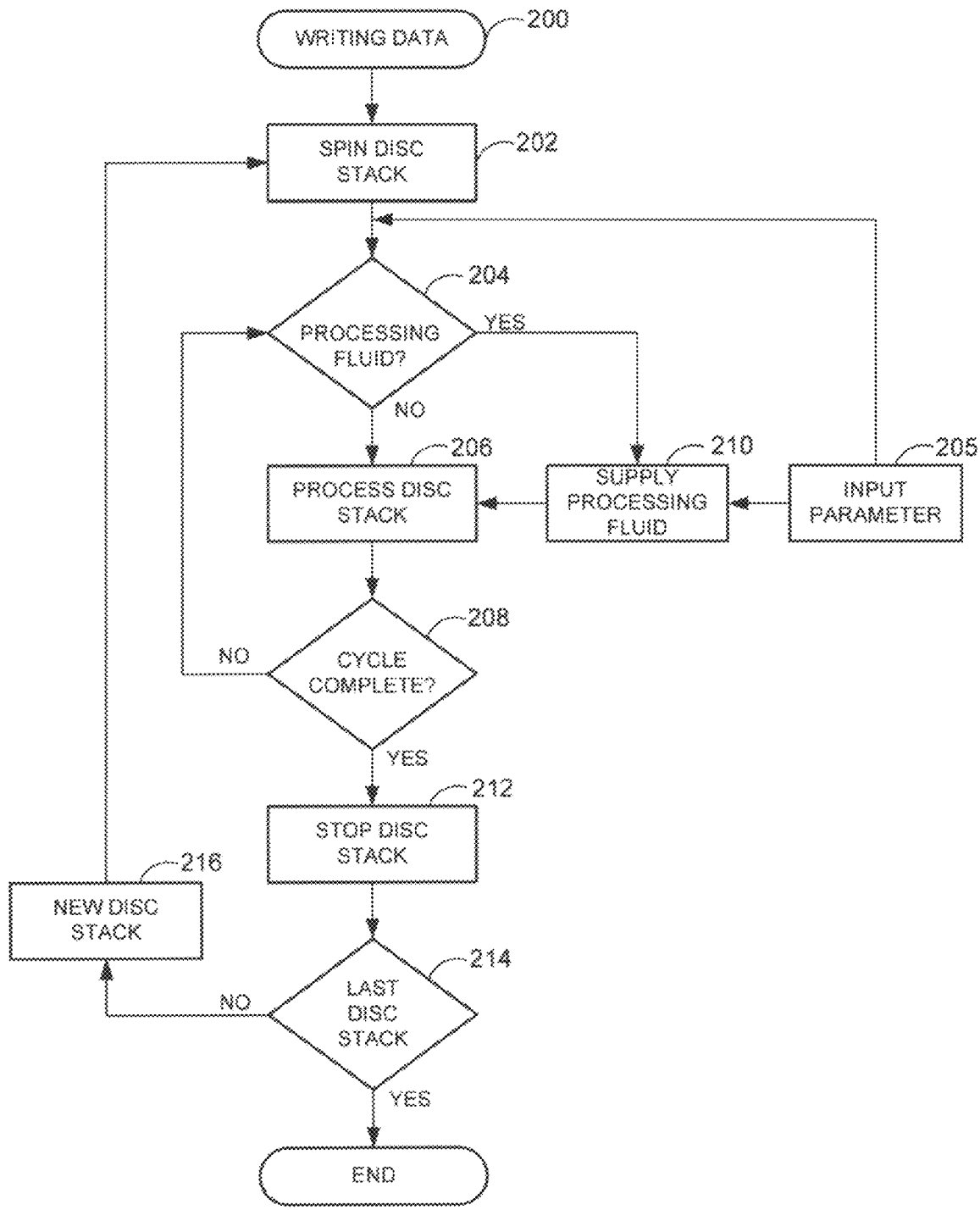
FIG. 8 is a flow chart depicting steps for performing a method of WRITING DATA in accordance with embodiments of the present invention.

FIG. 8 is a flowchart depicting steps in a method 200 for WRITING DATA in accordance with embodiments of the present invention. The method 200 begins in block 202 by operating the writing device as described above to rotate the disc stack. When operational speed is reached, it is determined in block 204 with input from block 205 whether the controller has called for delivering processing fluid to the disc stack. As described, that call may come from the completion of a predetermined interval since beginning processing, or it may come front a determination that the sensor value merits using the processing fluid. Again, the sensor may indicate a number of relevant input parameters calling for the use of processing fluid, such as temperature level or data transfer error rate and the like. As described, in some embodiments the processing fluid is delivered at all times that the writing is being performed.

If the determination of block 204 is no, then disc stack processing occurs in block 206 absent injecting processing fluid, with a continual checking for a call for injecting the processing fluid in the determination of block 208, which transfers control back to block 204 if the cycle is not yet complete. If, on the other hand, the determination of block 204 is yes, then processing fluid is supplied in block 210 to send the pressurized processing fluid to the nozzle. The nozzle directs the processing fluid to span the disc stack at the desired flow profile as provided by the flow features in the nozzle. Preferably, as described above, the nozzle directs the processing fluid to the disc stack with a flow profile that best compensates for the expected thermal gradient that is imparted by the transfer of heat from the motor to the disc stack. The supply of processing fluid can be regulated by the continued monitoring of the input parameter in block 205.

When block 208 indicates that the cycle is completed, the disc stack is spun down in block 212. It is then determined in block 214 whether the last disc stack has been processed. If the determination of block 214 is no, then the next disc stack is loaded in block 216 and control returns to block 202; otherwise, the method 200 ends.

The present embodiments have been set forth with respect to a writing device used to write data to a disc stack before the discs are assembled into a data storage device, but the contemplated embodiments are not so limited. In alternative embodiments for example, the present embodiments can be practiced within a data storage device itself which similarly has a spindle motor operably spinning a disc stack while performing data transfer operations.

The embodiments of the present invention generally contemplate a data writing device having a spindle supporting a disc stack in a data transfer relationship with a plurality of data transfer members, and having means for controlling part-to-part positional variation of the data transfer members in relation to respective storage locations of the disc stack by substantially equalizing the environmental temperatures in spaces adjacent the respective discs in the disc stack where the data transfer members reside in response to thermal excitation created by operating the writing device that heats the spaces at different rates.

For purposes of this description and the meaning of the appended claims, the meaning of "means for controlling" encompasses the structures disclosed herein and structurally equivalent structures that are capable of the controlling the part-to-part positional variation function as described. Particularly, the "means for controlling" encompasses the structure and equivalents that compensate for a thermal gradient that is imparted to a disc stack such that the environmental temperatures in which different HGAs in a disc stack operate vary significantly enough to create differential thermal drifting.

The meaning of "means for controlling" specifically does not encompass previously attempted solutions that might function to control windage and temperatures, but which do so in a constant manner with respect to all the HGAs across the disc stack. Such solutions might be said to reduce the effects of thermal excitation, but do not solve the problems addressed by the disclosed embodiments whereby the thermal excitations are not only lessened but they are substantially equalized to all HGAs in the disc stack as well.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, features of the illustrated embodiments can be interchanged and the particular elements may vary depending on the particular application while maintaining substantially the same functionality without departing from the scope and spirit of the present invention. In addition, although preferred embodiments described herein are illustrated with respect to a data writing system it will be appreciated by those skilled in the art that the teachings of the present invention can be applied to other systems as well without departing from the scope and spirit of the claimed invention.

What is claimed:

1. A fluid injector in a device that rotates a disc stack, the fluid injector comprising a nozzle defining a plurality of outlets that direct processing fluid from the nozzle to the disc stack, at least some of the plurality of outlets are each aligned with a space between adjacent discs of the disc stack, wherein a first outlet of the plurality is sized larger than a second outlet of the plurality to provide a substantially different flow rate from the first outlet compared to that of the second outlet.

2. The fluid injector of claim 1 wherein the disc stack includes first and second discs positioned at longitudinally opposing ends of the disc stack, and wherein the second outlet directs a maximum flow rate of the processing fluid from the nozzle into a space adjacent a storage surface of the first disc and the first outlet directs a minimum flow rate of the processing fluid from the nozzle into a space adjacent a storage surface of the second disc.

3. The fluid injector of claim 1 wherein the plurality of outlets are sized to direct an incrementally decreasing flow rate of the processing fluid along the nozzle.

4. The fluid injector of claim 1 wherein each of the plurality of outlets is aligned with a space adjacent a storage surface of a respective disc of the disc stack.

5. The fluid injector of claim 1 wherein the nozzle defines a deflector that apportions an individual flow of the processing fluid entering an inlet of the nozzle into a desired varying flow profile leaving the plurality of outlets.

6. The fluid injector of claim 1 further comprising a flow control device having a sensor coupled to a controller to selectively regulate a flow rate with which the processing fluid enters the nozzle from a supply of the processing fluid.

7. The fluid injector of claim 6 wherein the sensor is responsive to changes in temperature.

8. The fluid injector of claim 6 wherein the sensor is responsive to changes in an observed data transfer error rate.

9. The fluid injector of claim 1 wherein the second outlet directs a higher flow rate of the processing fluid than the first outlet.

10. A method comprising:
rotating a disc stack;
supplying a processing fluid to a fluid injector having a nozzle defining a plurality of outlets that direct the processing fluid from the to the disc stack, wherein a first outlet of the plurality is sized larger than a second outlet of the plurality to provide a substantially different flow rate from the first outlet compared to that of the second outlet; and
sensing a temperature within the disc stack and responsively regulating a flow rate with which the processing fluid enters the nozzle.

11. The method of claim 10 wherein the second outlet directs a higher flow rate of the processing fluid than the first outlet.

12. The method of claim 10 wherein the supplying step is characterized by directing an incrementally decreasing flow rate of the processing fluid along the nozzle.

13. The method of claim 10 wherein the supplying step is characterized by some of the plurality of outlets being each aligned with spaces between adjacent discs in the disc stack.

14. The method of claim 10 wherein the supplying step is characterized by a deflector apportioning an individual flow of the processing fluid entering an inlet of the nozzle into a desired varying flow profile leaving the nozzle.

15. A data writing device, comprising:
a spindle operably supporting a disc stack in a data transfer relationship with a plurality of data transfer members; and
means for controlling part-to-part positional variation among different data transfer members of the plurality in relation to respective storage locations of the disc stack by substantially equalizing environmental temperatures in spaces adjacent the discs in the disc stack where the data transfer members reside in response to thermal excitation created by operating the writing device that heats the spaces at different rates.

* * * * *